United States Patent [19]
Hutson

[11] Patent Number: 6,026,493
[45] Date of Patent: Feb. 15, 2000

[54] SYSTEM FOR CONSERVING ENERGY AMONG ELECTRICAL COMPONENTS

[75] Inventor: Adam Bruce Hutson, Dortmund, Germany

[73] Assignee: Adam Hutson Research

[21] Appl. No.: 08/907,943

[22] Filed: Aug. 11, 1997

Related U.S. Application Data

[63] Continuation-in-part of application No. 08/615,075, Mar. 4, 1996, Pat. No. 5,656,875, which is a continuation of application No. 08/174,882, Dec. 27, 1993, abandoned.

[51] Int. Cl.⁷ ................................................. G06F 9/00
[52] U.S. Cl. ............................................................ 713/320
[58] Field of Search ................. 364/DIG. 1, DIG. 2, 364/137, 506; 713/300, 310, 320, 324, 330, 340, 322, 323; 340/825.72

[56] References Cited

U.S. PATENT DOCUMENTS

| | | | |
|---|---|---|---|
| 4,228,511 | 10/1980 | Simcoe et al. | 364/506 |
| 4,712,019 | 12/1987 | Nilssen | 307/141 |
| 5,109,222 | 4/1992 | Welty | 340/825.72 |
| 5,241,680 | 8/1993 | Cole et al. | 395/750 |

*Primary Examiner*—Robert B. Harrell

[57] ABSTRACT

This patent deals with an energy savings circuit, which is itself composed of two circuits, such that levels of activation are established, with specific criteria being met at each level of the sequence. This is referred to as stacking. Another sequence can also be achieved in chaining the circuits together. Yet another can be achieved by clustering them. With each circuit interaction type, there is a distinct order of activation of the circuits, such as cresting, full-wave, and intermittent activation sequences. Also, this patent deals with a system of multiple circuits such that, by the self-regulation of circuit activation sequences or strategies, can achieve greater energy efficiency, processing speed, processor accuracy, and/or signal integrity. This can be accomplished on a variety of dedicated and non-dedicated hardware combinations using commercially available, high-level languages, assembly, or hardware specific languages created by manufacturers for their hardware.

12 Claims, 11 Drawing Sheets

| METHOD OF INTERACTIONS | ACTIVATION SEQUENCES | USES OR BENEFITS |
|---|---|---|
| CHAINED PHYSC. | CREST<br>FULL WAVE<br>EXCLUSIONAIRY | SIGNAL INTEGRITY<br>SIGNAL INTEGRITY, PROCESSOR EFFICIENCY<br>PROCESSOR EFFICIENCY |
| STACKED LOGIC | CREST<br>FULL WAVE<br>EXCLUSIONAIRY | POWER SAVINGS, SPEED SAVINGS<br>PROCESSOR EFFICIENCY<br>ARTIFICIAL INTELLIGENCE |
| CLUSTERED | FULL WAVE<br>EXCLUSIONAIRY | POWER SAVINGS<br>PROCESSOR EFFICIENCY, ARTIFICIAL INTELLIGENCE |

FIG. 8

SYSTEM FOR CONSERVING ENERGY AMONG ELECTRICAL COMPONENTS

CROSS-REFERENCES TO RELATED APPLICATIONS

This Application is a continuation in part of U.S. application Ser. No. 08/615,075, filed on Mar. 4, 1996 now U.S. Pat. No. 5,656,875, which is a continuation of U.S. application Ser. No. 08/174,882, filed on Dec. 27, 1993 now abandoned.

BACKGROUND OF THE INVENTION

1. Field of the Invention

This patent relates to new applications of an energy savings system that was disclosed, by the inventor, in the said U.S. Application. This system allows for energy savings to occur when a circuit activates a second circuit(s), which immediately causes the first circuit to cease it's activation signal to the second circuit(s). The second circuit(s) then carries out a predefined process and then turns itself off. In such cases where an outside condition is monitored by the first circuit, the second circuit(s) need not be on and; therefore, using power until the first circuit detects this sought after condition.

Furthermore, the improvements in the general efficiency of processing, which is enhanced by the use of a circuit, or combination thereof, with a high level of appropriateness of the use verses another for a given task; or combinations or groups, with their respective execution sequences thereof, is also claimed in this application. This general efficiency of processing can be described in such terms as processing speed, and/or the degree of accuracy of a processor's work.

This system can exist in many forms: computer software on a dedicated or non-dedicated computer system, dedicated electronic hardware, or some combination of these two. It can also be brought about in a form whereby the software is coded or 'burned' into the actual hardware of a programmable logic device or micro-controller. For example, various circuits could be composed of one or more of Motorola's® MP68HC-11 micro-controllers, or one or more of Intel's® Pentium Processors, or the logic units of one processor, thereof. Such high level languages such as BASIC can be used to program certain commercially available controllers also. An example of the BASIC code has been provided in this patent. There are also industrial applications with the programmable logic controllers that often use a programming language created by the manufacturer. The system also can be encoded in such low level languages as Assembly, or medium level languages as C++. Naturally, it could also be encoded in a higher level languages such as JAVA. Non-dedicated hardware such as PCs including lap-top PCs, and larger capacity commercial computers, along with dedicated hardware such as computer cash-registers and mobile phones are meant to be covered, for example. A system, as defined by the applicant, includes any software or hardware, or combination thereof, that is capable of executing the system described in this patent. Various methods of encoding information such as wire-bound electrical signals, optical or radio wave signals, or combinations thereof, are included in this invention.

In this application, all references to circuit(s) are to be presented, for the purpose of reducing this system to practice, by the use of the circuit, which is itself composed of two circuits, disclosed in FIG. 1, or a variation(s) on or combination(s) thereof. The basic circuit described in FIG. 1 will be referred to as a 'basic circuit' for the purposes of this patent.

2. Related Art

Many systems require that one or multiple situations or processes, which can be intermittent in nature, be monitored to determine if a certain state or states exists. Typically, there is some circumstance that must be addressed while the system is stopped or paused, or when a certain condition or state has been identified as having occurred. The system has, in effect monitored itself, in order to determine if a certain condition within the system has come into existence. At this point, a second circuit or system could be signaled to act in some way.

Such is the case in intelligent, automated production systems such as a programmable profiler which can monitor the workpiece that it is machining, and determine when it has successfully completed the program; therefore, needing to have the finished workpiece removed and possibly a new work piece loaded in the machine. The profiler then could signal a server that it's workpiece is completed and that the server should execute it's program to service it. The server, upon receiving the signal from the profiler, returns a signal to the profiler that it has received the signal. The profiler is programmed to go into a lower power sleeping mode until the server can send an industrial robot to replace the finished workpiece and reset the profiler. Once this is completed, the server returns to a low power mode and waits for the next signal from another profiler.

Present systems allow no power savings for profilers that stand idle while waiting for some needed condition to met such as the changing of a workpiece. This system would allow all machines that are not needed, to automatically go to powered down or off status while another system(s), who have a separate set of capabilities and may be in a separate location, are activated into a separate action.

In another example, low power, micro-electronic temperature sensors for monitoring the local room temperature in large commercial spaces could be pre-programmed to signal a main computer, either through dedicated wires or with remote wireless technology, that the temperature in a space has fallen below a certain pre-programmed value. The server could then execute a very localized, precise response in a large building instead of attempting to heat an unnecessarily large space or being required to add additional heat to an entire space when only one section of the space has an unacceptable temperature level, or to heat all spaces to only one pre-set temperature.

This would be executed by allowing an main heating duct to open only in that localized location. This heating duct could be a centralized duct and could have such sensors stay in high power mode long enough to keep the heat register open, while the furnace pumped hot air through it.

In the design of computer processors, both asynchronous, synchronous and in parallel processing, the CPU can act to signal certain other CPU units such as extra arithmetic units to execute a task with the arithmetic unit signaling that it has received the command and will execute it. The CPU need not turn itself off, rather it could move on to the next task. The arithmetic unit then completes the calculation and returns the requested answer, thereafter turning itself off. Present processors tend to keep unneeded units of a CPU powered up when unnecessary, as the units themselves have no capability to shut them selves down when they have completed an assigned task or have no work to do.

SUMMARY OF THE INVENTION

Particularly, in the case of asynchronous processing, the independent units can interact with each other in a 'Chained, Clustered', or a 'Stacked' manner. This manner can be achieved by either Crests, Full Wave, or Exclusionary activation Sequences of the circuits.

The Crest Sequence of Activation refers to activating a circuit, that is a member of a sequence, such that a circuit turns itself off after the preceding circuit has been activated. This sequence is particularly useful in power savings with integrity of signal.

The Exclusionairy Sequence of Activation refers to not a physical stacking, but a stacking in terms of what circuit will be activated first, second, third, and last, ect. When the predetermined standards for determining the sequence are met, power savings, and operational speed increases can occur such that previous activated circuits, which are not suited for a particular job, can deactivate themselves while the fastest or most power efficient circuit can stay on. Therefore, it is possible to have to use an Exclusionairy Activation where the system can execute a pre-determined, but unique response based on certain criteria being recognized by the system, such as the first two circuits are overwhelmed; therefore, making a third circuit necessary to use.

In the Full Wave Sequence of Intercation, all circuits can stay on, with the processing power therefore, growing as necessary.

The 'Clustered' Method of Interaction consists of several systems interacting with a 'server system'.

The 'Stacked' Method of Interaction allows layers to be created with the activation of each layer being dependent upon some condition(s) within that layer being met. For example, simpler, lower power processors or a faster micro-processor could be incorporated first in an activation sequence for a desired analysis or task. In fact, a series of processors, all with different power requirements, processor speeds, ect. could be arranged in a pre-defined sequence of activation, all standing in line, as it were, to take a turn at solving a problem if all processors before it decided that they were not able and called the next to work. Of course a group of systems could interact with another group of systems which are of another type or types. An example being, a group of clustered systems which could be stacked, in multiple layers, upon a chained group of systems, ect. All logical combinations of interactions methods are logically built from these basic interaction methods.

It is apparent that certain interaction methods, based upon how they are used in specific applications, may also lead to more artificially intelligent systems that are faster at executing tasks, and more efficient self-teaching, neural-nets, than the present art.

BRIEF DESCRIPTION OF THE DRAWINGS

FIG. 8 Table of Circuit Interaction Combinations and Interaction Sequences

FIG. 9(b) Top View, Tape Sensor; Micro-Cassette

Figure 1A:
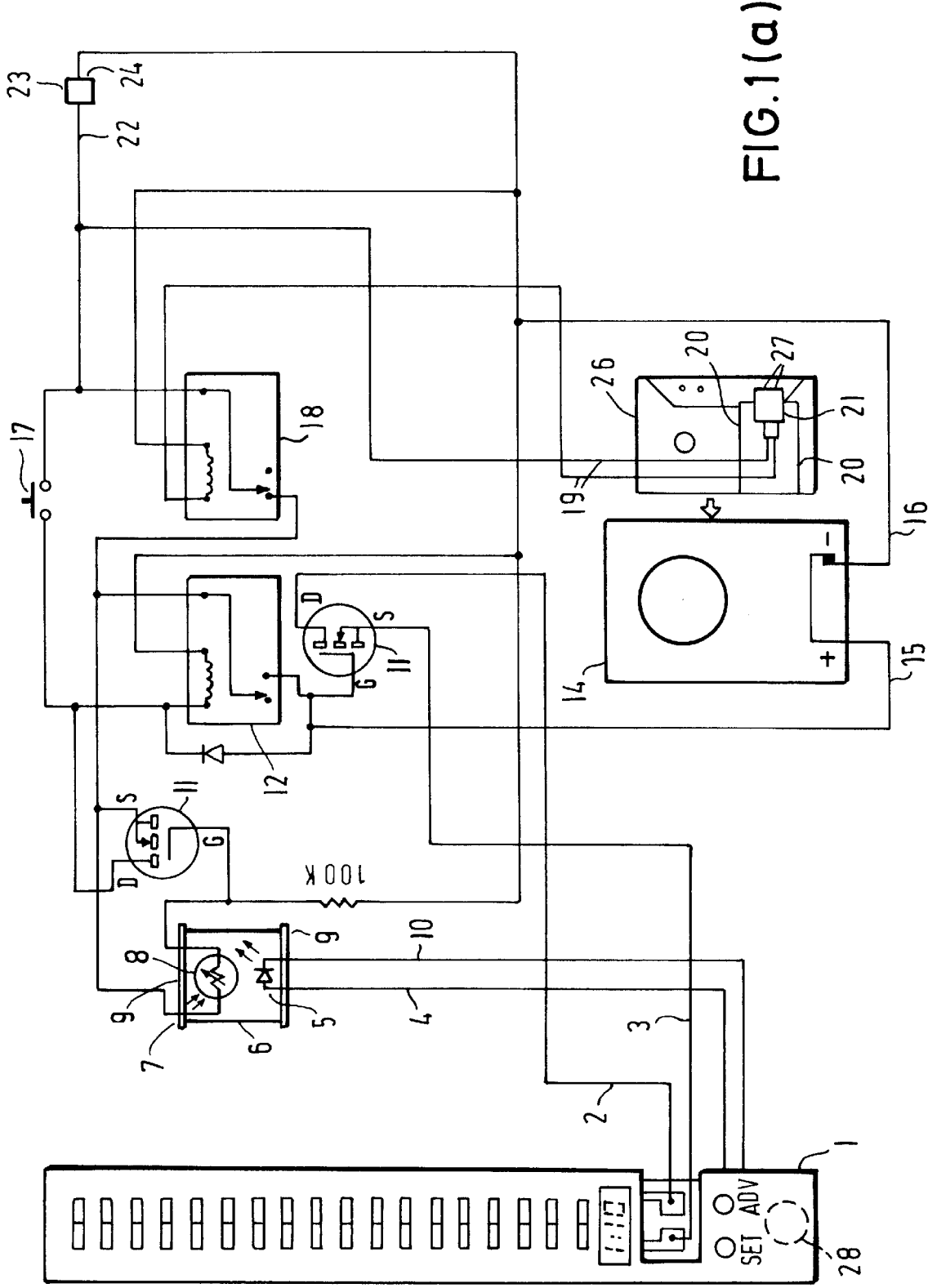
FIG. 1(a) 'Circuit Schematic' from U.S. application Ser. No. 08/615,075

Appendix: Example of BASIC Code As Used In A High Level Programming Language

DETAILED DESCRIPTION OF THE INVENTION

The following part numbers are used in the drawing figures:

1 'Appointment Monitor' acting as Timer-Alarm. The Brookstone 'Appointment Monitor' is interchangeable here.
2 Wire Connecting Alarm/Timer to FET 'Supply'
3 Wire Connecting Alarm/Timer to FET 'Drain'
4 Wire From Timer/Alarm to LED Cathode
5 Red LED (Radio Shack® Catalog No. 276-196)
6 Steel tube section, length 0.55 inches, inside diameter 0.4 inches
7 Cardboard Opaque End Cover with 0.022 inch holes spaced for component leads
8 Photoresistor (Radio Shack® Catalog No. 276-196)
9 Cardboard Opaque End Cover with 0.022 inch holes spaced for component leads.
10 Wire From Alarm/Timer to LED Anode
11 Motorola® MPF 6660 Field Effect Transistor
12 Potter&Brumfield® 3 Volt Relay (Part No. T81N5D212-03)
13 Wire (Ground)
14 Modified Tape Recorder (Radio Shack® Micro-Cassette Tape Player or other listed Device)
15 Power To Tape Recorder's Positive Battery Terminal
16 Tape Recorder Battery Ground
17 Function Switch (Two position, Normally Open Switch)
18 Potter&Brumfield® 3 Volt Relay (Part No. T81N5D212-03)
19 Double Wire
20 Tape Sensor Bracket (Ductile Copper Sheet)
21 Prong Mounting Block, Plastic
22 Positive Power Bus
23 (4) 'AA' Battery Holder and Batteries
24 Ground Bus
25 Foil Marker from Radio Shack®
26 Modified Micro-Cassette Tape
27 Tape Sensor Prongs (Acco®Brand, #1 Silverette Paper Clip)
28 Low Power Watch Battery With reference to FIG. 1(a), this circuit can be built on an experimental socketed circuit board or more permanent ways. The Radio Shack® Micro-Cassette Recorder (Cat. No. 14-1175) is interchangeable the Radio Shack® (CTR-22) Cassette Tape Recorder.

At a pre-designated time, the timer/alarm 1 will send a series of pulses to the red LED 5. With each pulse, the photoresistor 8 allows potential to build on the base of the FET 11. The FET 11 allows the power from the power bus to energize the first relay's 12 coil. The relay 12 is designed to lock open as long as power is maintained on the power bus. The tape recorder 26 receives power from the open relay post. Also, a FET 11 allows the timer/alarm's 1 momentary 'stop' to be closed, therefore turning the alarm off after the relay is open. Power is supplied continuously to the power bus by the second relay 18 in it's normal position. The tape sensor acts to energize the second relay 18 when it's prongs 27 are momentarily connected by a foil marker 25 on a passing cassette tape 26. When the second relay 18 is energized, the power bus loses power and the first relay 12 returns to the normal position with no power supplied to the tape recorder 14. The tape 26 moves sufficiently to break the tape sensor's prong's 27 contact with the foil marker 25 before it stops moving. The tape sensor consists of the following parts: 19, 20, 21, 27. The tape sensor prongs 27 are made from the modified paper clips.

In the case of using the above described circuit for linking circuits in the Chained, Stacked, or Clustered Methods of Interaction, the wires 15 and 16 can be hooked up to their respective battery terminals on the timer/alarm 1; therefore, making it necessary to remove the battery of the timer/alarm 1 first. The timer/alarm will, once power is applied, automatically go to a predefined pre-set time and begin counting towards the next designated alarm time. Therefore, it can only act as a timer rather than as a timer and/or clock, as in the case of the it's use in the first instance. This power savings feature of having a low power circuit perform one function such as observing for a long period of time a certain circumstance looking for an event, which is in this example represented by the timer/alarm 1, may not always be neccesary or desirable. When the search must occur over a long period of time, or multiple sensors over a large area must be used, or the locations of the first circuit must be separated from the second circuit, or very complex conditions must be observed, will it then make sense to have a separated first circuit as a node, and the second circuit as a separate node. It may be necessary, in some cases, that further circuits connected to the original set displayed in FIG. 1, as progressions of circuits only being second circuits, could be without first circuit parts themselves. Circumstances may dictate for some circuit activation sequences that some part(s) of the sequence would have this 'first circuit' feature and some would not, therefore, being intermixed.

Figure 1B:
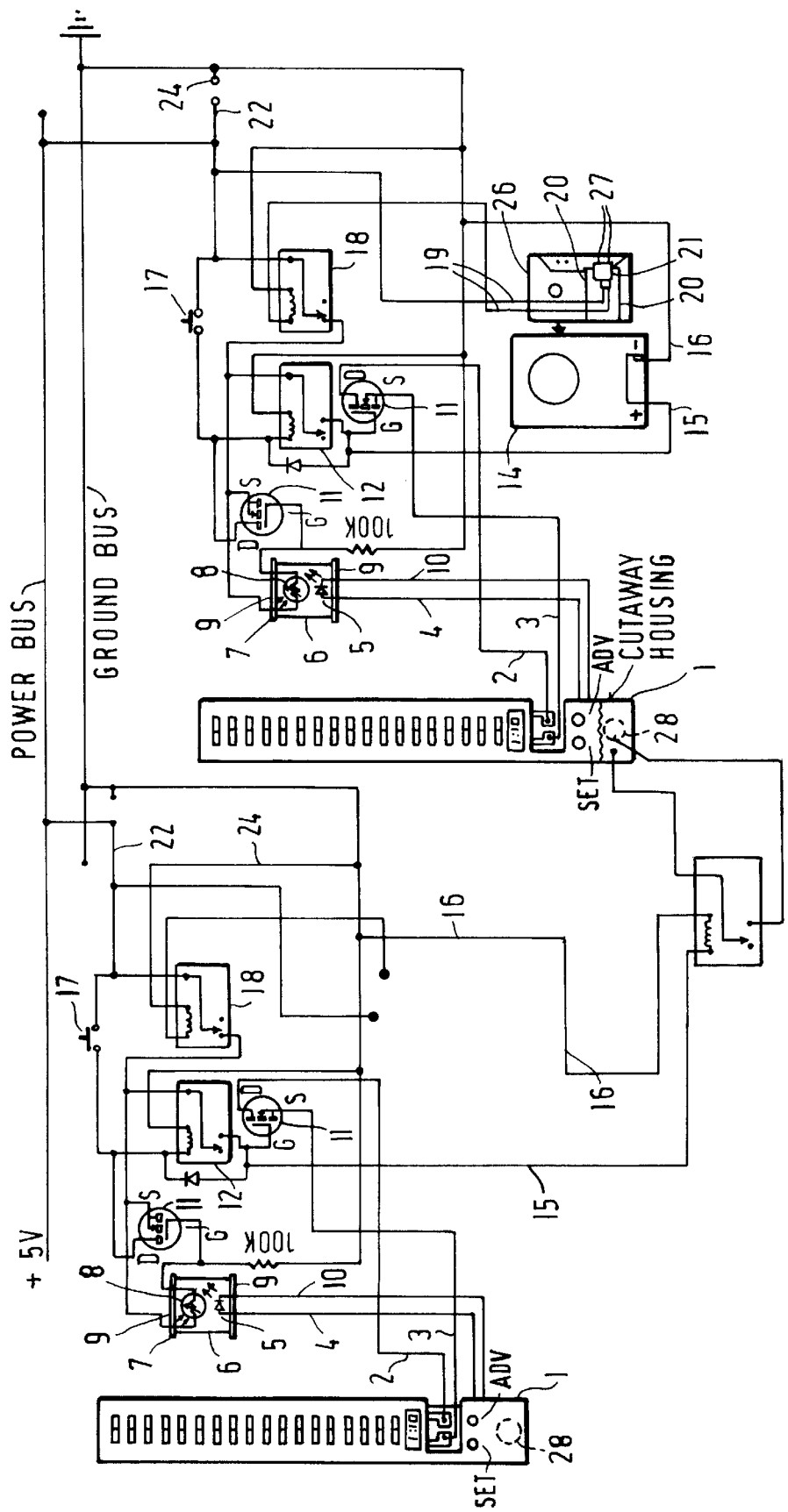
FIG. 1(b) Schematic Showing Connection of Two FIG. 1(a) Circuits
Figure 1C:
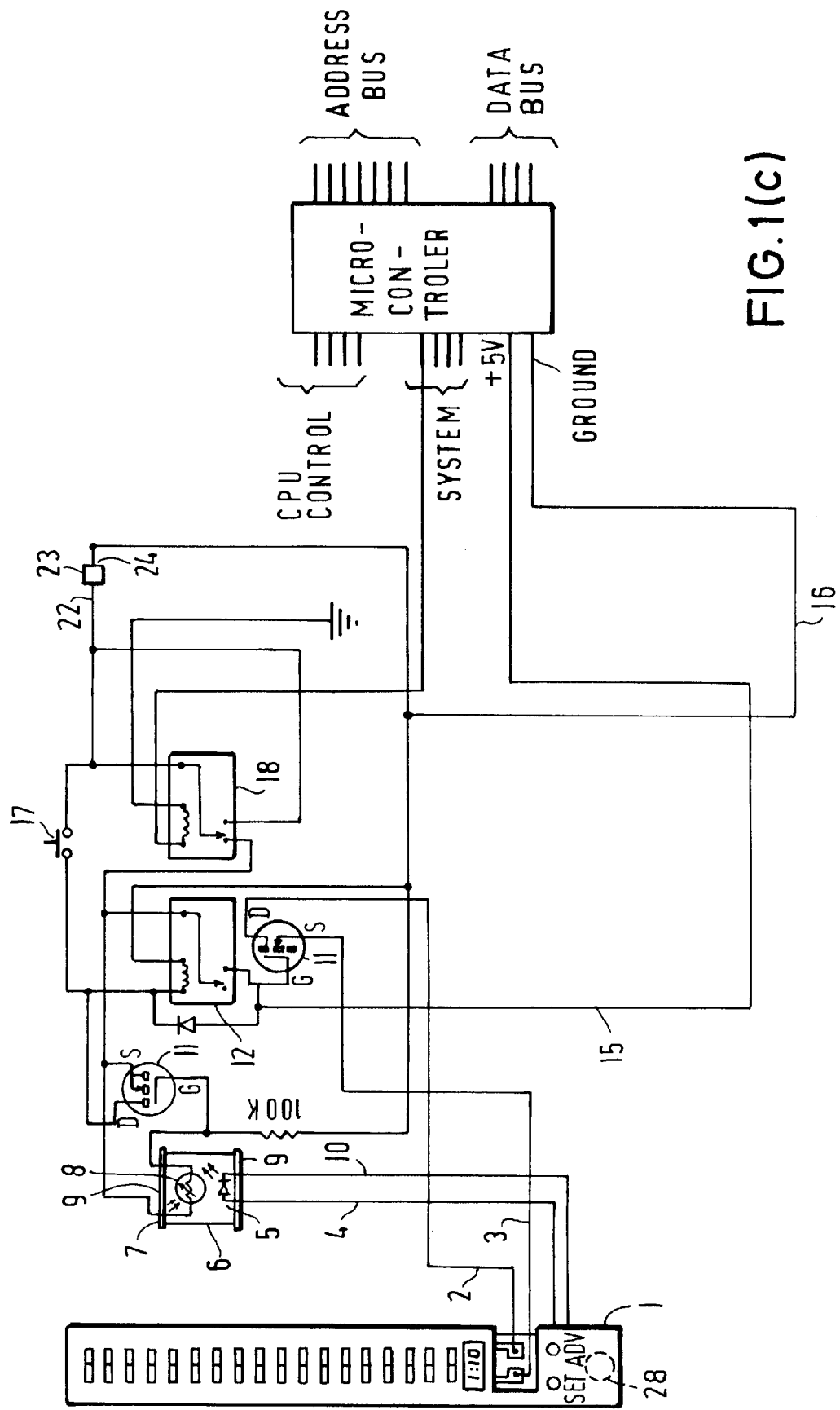
FIG. 1(c) Schematic Showing FIG. 1(a) Connected To Micro-Controller Element

With reference to FIG. 1(*b*), the schematic shows how FIG. 1(*a*) circuits could be connected to work in the Chained method of interaction, with a Full Wave sequence of activation. The tape recorder in the first FIG. 1(*a*) has been removed so that it can drive the second FIG. 1(*a*) circuit. In this case, the second FIG. 1(*a*) circuit is a seperate element. In this particular case, the circuits share a common energy source.

With reference to FIG. 1(*c*), the schematic shows how a FIG. 1(*a*) circuit can be connected to a commercially available micro-controller to perform all of the types of interactions, and activation sequences. In this case, the FIG. 1(*a*) circuit activates the micro-controller, which serves as a second, separate circuit.

Figure 2:
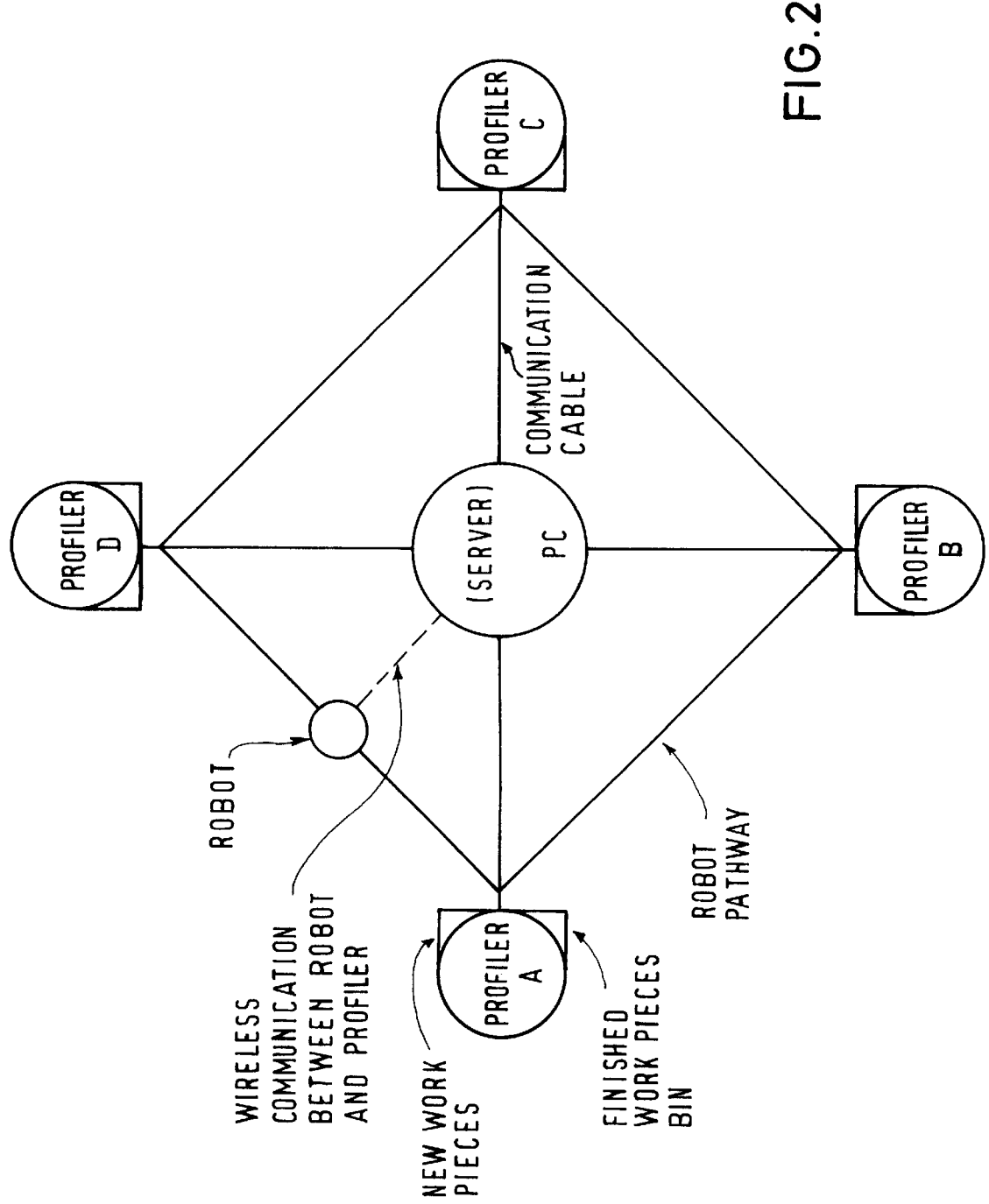
FIG. 2 Diagram of Factory Automation Application

With reference to FIG. 2, this diagram shows the physical layout of (4) profilers in a factory automation application. The server, which in this case is a PC, acts as a base for a robot that travels form location to location replacing machined workpieces with blanks, and then resetting the machines. The server acts to coordinate and manage the activities of the various members.

There is a combination of hardware and software used here, whereby the system exists in software form (C++) in both the PC and the dedicated computer's dedicated language used by the computer on-board the profiler.

Figure 3:
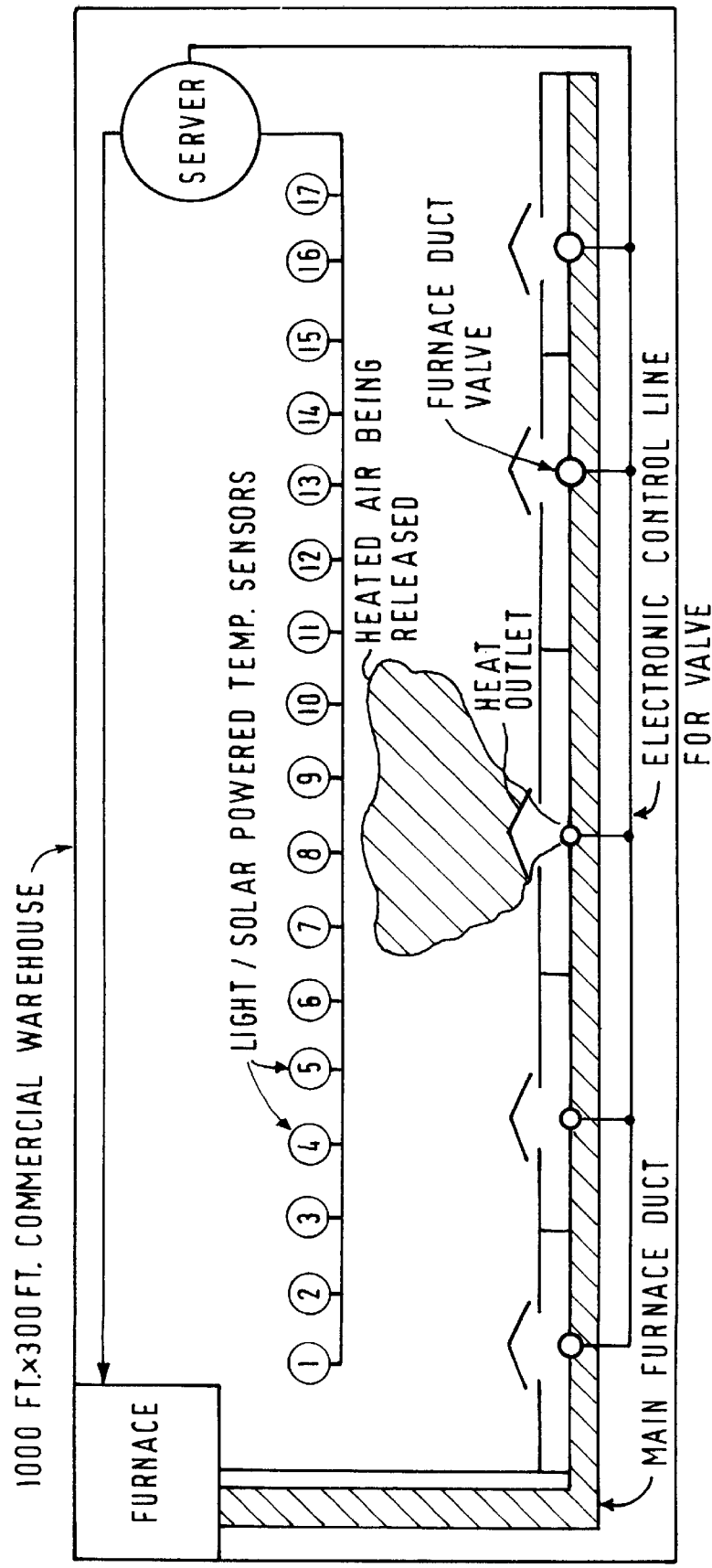
FIG. 3 Diagram of Temperature Monitoring Application

With reference to FIG. 3, the diagram shows the temperature sensors, numbering (17) in all, that can communicate individually or in combinations with the server. The server, in this case can be a PC, or a programmable logic unit; in which case the interaction between the sensors and server could be wireless. The server then regulates the furnace duct valves allowing the heat outlets to release heat in the specific area of the large commercial space. All of this comes off the main furnace duct.

Figure 4:
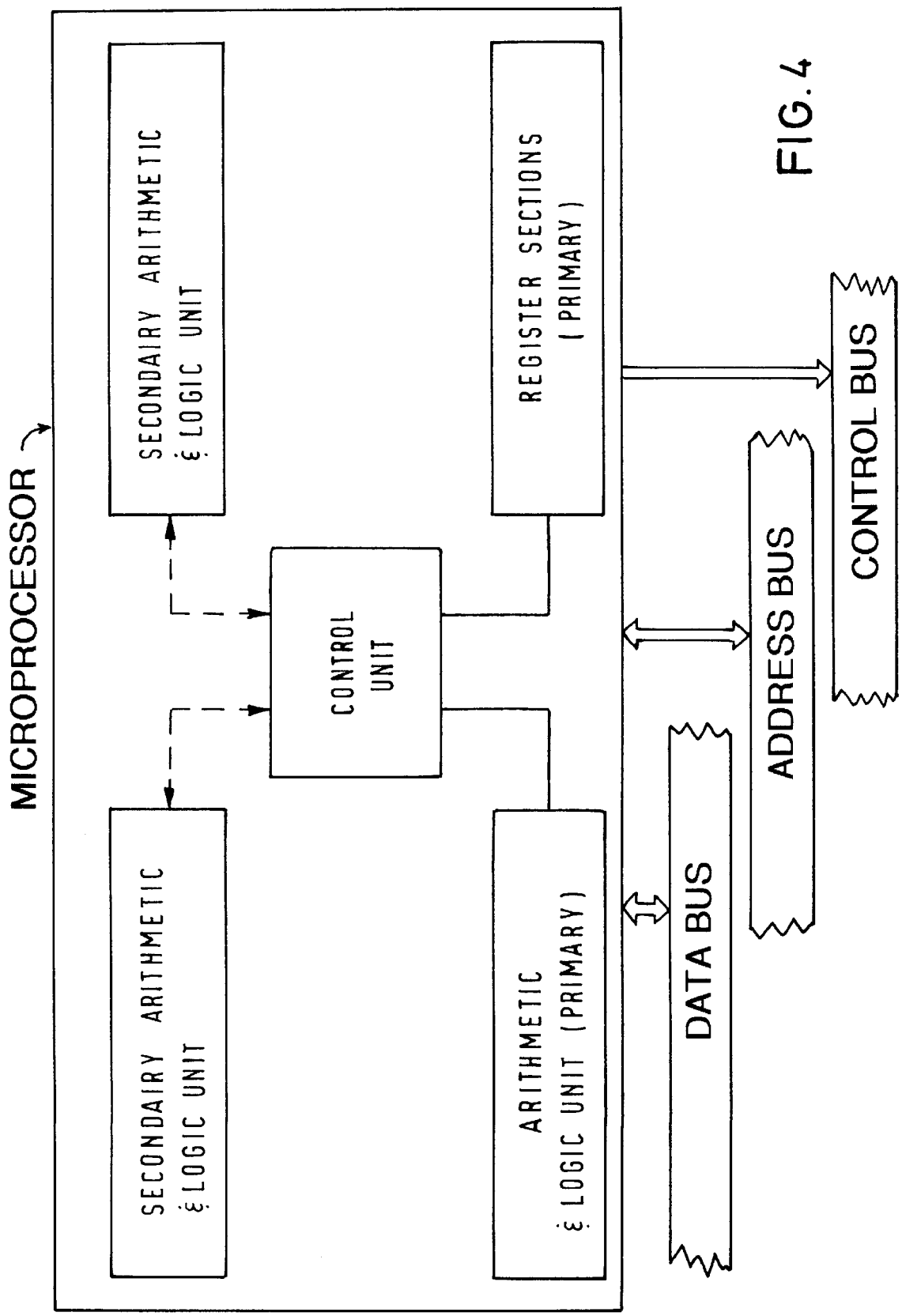
FIG. 4 Schematic of CPU Circuit Design Application

With reference to FIG. 4, the schematic shows the various independent units of a micro-processor, or central processing unit. The dashed lines between the control unit and secondary arithmetic & logic units indicate that these units are only activated when necessary, and are capable of turning themselves off when possible.

Figure 5:
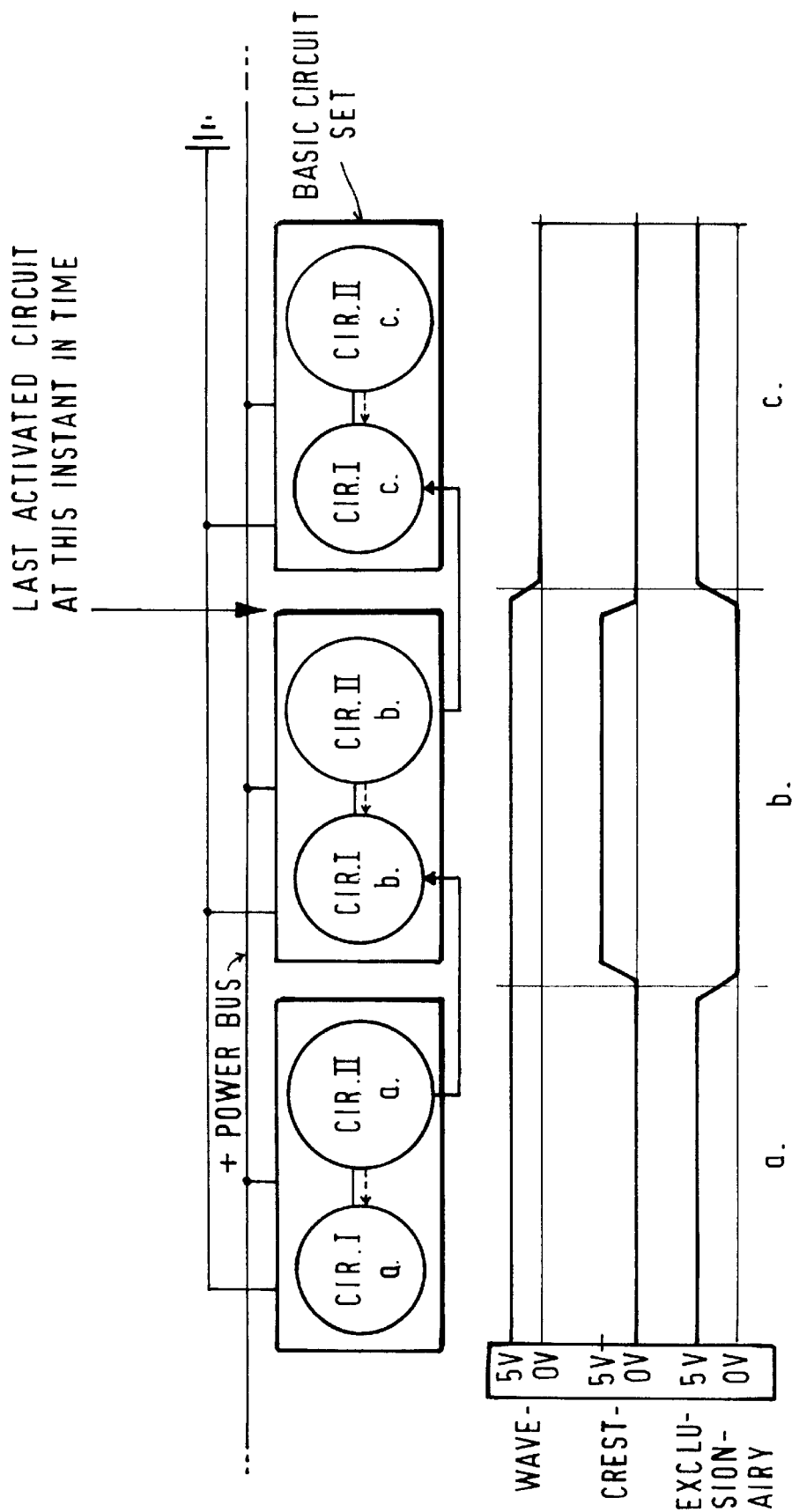
FIG. 5 Schematic of a Stacked Method of Interaction of Circuits

With reference to FIG. 5, the schematic shows a stacked method circuit interaction. The stacked method of interaction could physically appear to look similar to a chained method, except that a specific criteria must be met before each succeeding circuit will activate itself in the Chained Method. The succeeding links or circuits in a chained method of interaction are automatically designed to activate in succession like a row of dominos. One can conceptualize this by seeing the water level push the water level up succeeding steps of a partially submerged set of stairs in a pool. As the water level increases in the pool, the level reaches ever higher steps; however, the water level must have first reach the level of all the preceding steps before it can overflow onto the face of the next step.

The key here seeing that although 'Stacked' circuits can have the same physical activation sequences that chained sequences have, the activations are not automatic, but rather based on some criteria being met at each succeeding level or circuit. The activation diagrams are displayed below the circuits in question, and indicate which circuits are active.

Figure 6:
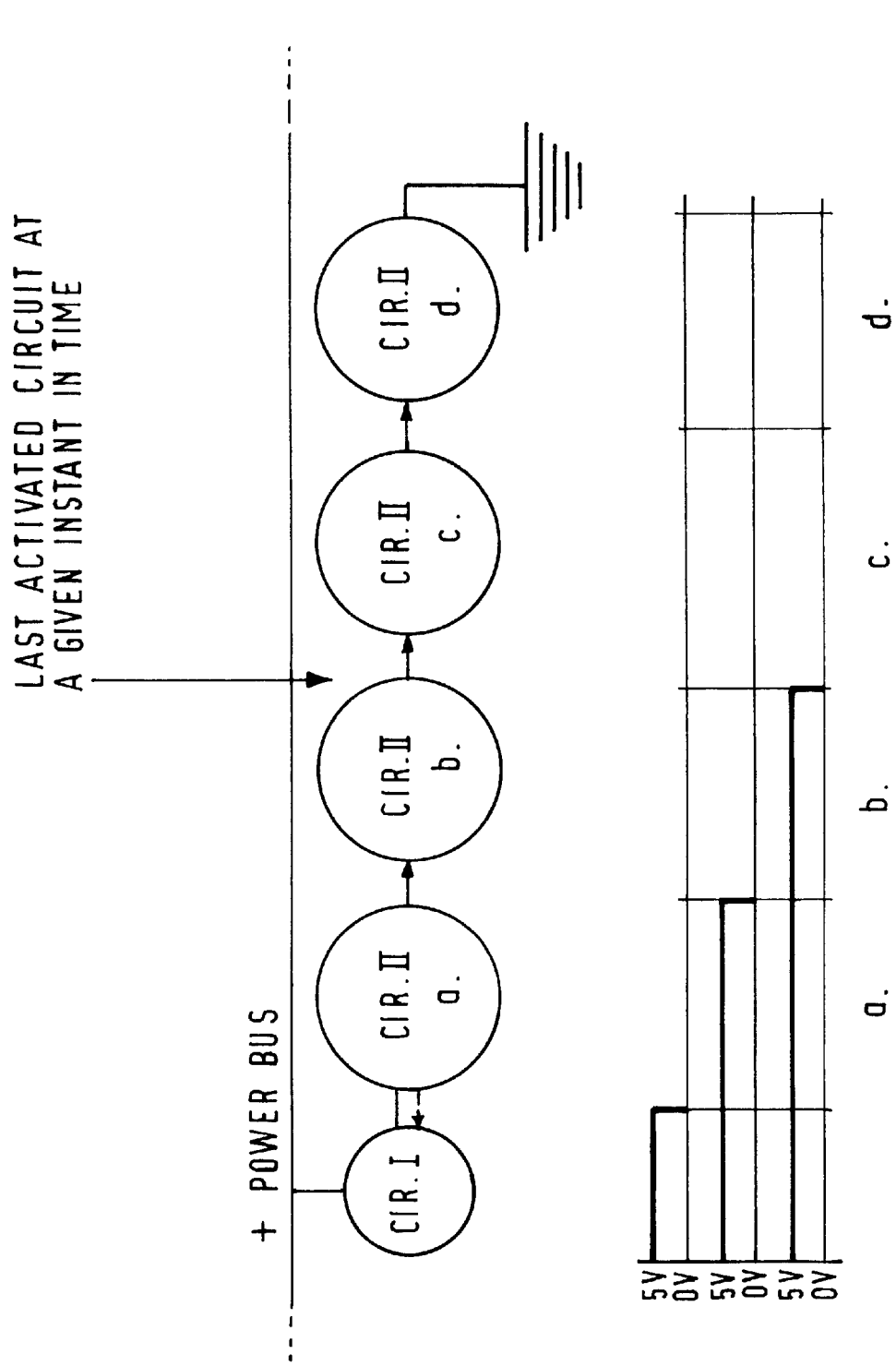
FIG. 6 Schematic of Chained Method of Interaction of Circuits

With reference to FIG. 6, the Chained Method of Interaction is displayed here. This method of interaction is a non-criteria based method of circuit interaction. (Although an Exclusionary Activation exists.) The activation diagrams are displayed.

Figure 7:
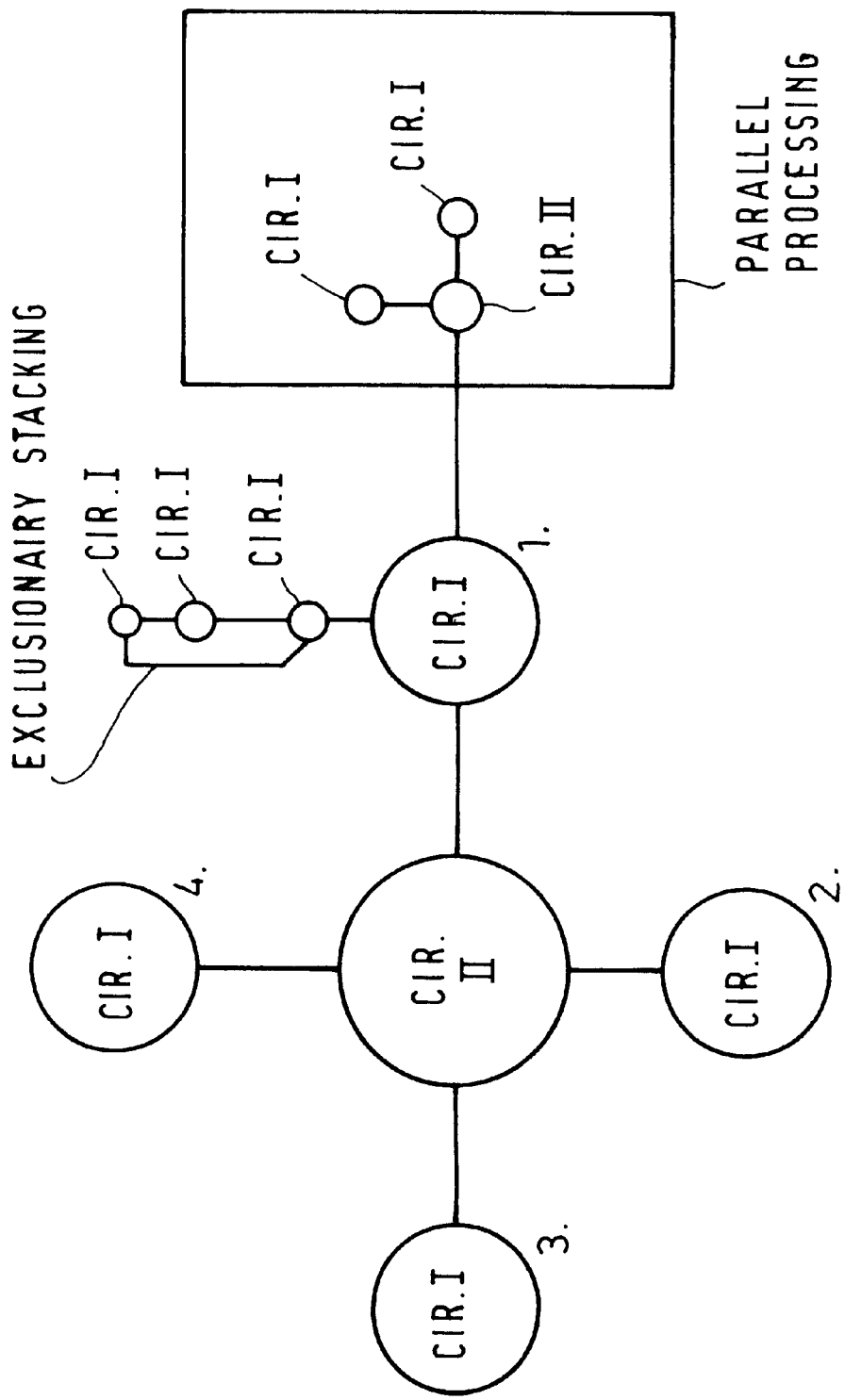
FIG. 7 Schematic of Clustered Method of Interaction of Circuits
Figure 9A:
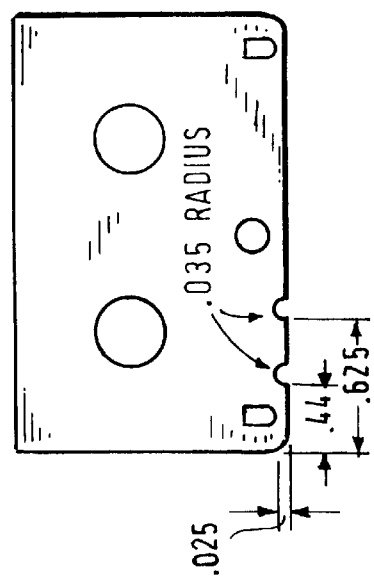
FIG. 9(a) Modified Micro-Cassette Tape
Figure 9B:
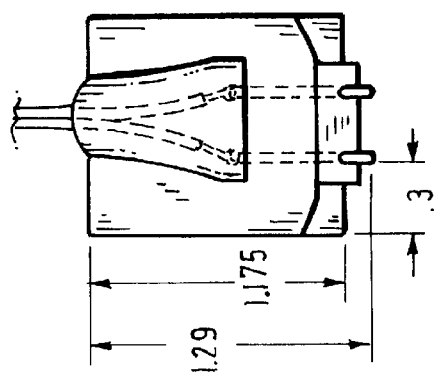
Figure 9C:
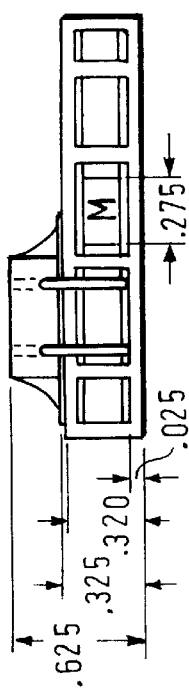
FIG. 9(c) Front View, Tape With Sensor
Figure 9D:
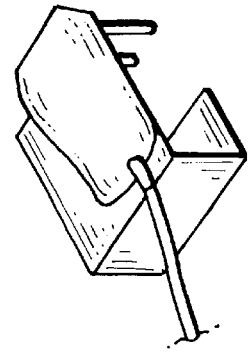
FIG. 9(d) Tape Sensor in Perspective
Figure 9E:
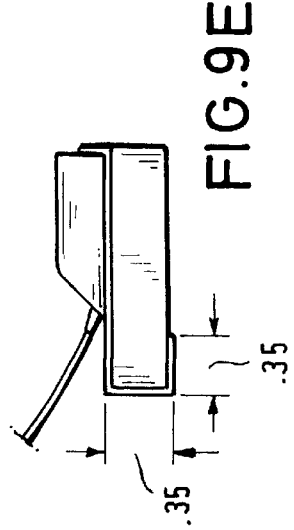
FIG. 9(e) Side View, Tape With Sensor

With reference to FIG. 7, the schematic displays the 'Clustered' Method of Interaction, and how that might be combined with a Stacked Method of Interaction.

With reference to FIG. 8, the table displays the various Methods of Interactions, and possible Activation Sequences along with the possible benefits thereof.

With reference to FIG. 9(*a*), the image displays the Top View of a modified micro-cassette tape.

With reference to FIG. 9(*b*), the image displays the Top View of tape sensor for micro-cassette.

With reference to FIG. 9(*c*), the image displays the Front View of tape sensor and micro-cassette tape.

With reference to FIG. 9(*d*), the image displays the tape sensor in perspective.

With reference to FIG. 9(*e*), the image displays the tape sensor in the Side View with tape.

Thus the scope of this invention should be determined by the appended claims and their legal equivalents, rather than by the examples given.

Several advantages of the present invention are:
 (*a*) Decentralized systems can be built from combinations of these basic circuit methods of interactions and activation sequences.
 (*b*) They can exist in a virtual state, such that 'circuits' would be actual interacting software on a variety of different computers in different locations.
 (*c*) Maximal efficiency in processing, affecting such factors as processing speed, power usage or accuracy of calculations for a given task, could be optimized through flexible self-regulating systems. The system would therefore be self-modifying or self-directed.

(d) Circuit integrity could be further enhanced and insured through the Chaining Method of Intercation.

Appendix

Computer Code for Circuit 1(s) (In BASIC)

```
10 LET M=0
20 LET P=0
30 LET R=0
40 LET K=0
45 INPUT 'R'
50 LET P=0
52 LET KK=0
54 *P=0 INDICATES NORMAL OPERATION*
55 READ K (FROM CIR.II's PROGRAM CODE)
60 IF K=1 THEN GOTO 80
70 GOTO 50
80 LET P=1
82 *MACHINE IS IN STAND-BY MODE*
85 LET KK=1
87 SEND KK VALUE TO CIR. 2
90 M=M+1
100 IF M=R THEN GOTO 50
110 GOTO 90
120 END
```

Computer Code for Circuit 2 (In BASIC)

```
2 LET X=0
3 LET R=0
5 LET Z=0
7 LET M=0
9 INPUT R
10 LET X=0
12 LET K=0
20 X=X+1
30 IF X=R THEN K=1
40 IF K=1 THEN SEND K VALUE TO CIR. 1
50 *K=1 WILL ACTIVATE CIR. 1*
60 READ KK (FROM CIR. 1)
70 IF KK=1 THEN GOTO 10
80 GOTO 20
90 END
```

I claim:

1. An electronic system for conserving energy, said electronic system comprising:

at least a first system comprising n elements connected to at least a second system comprising m elements, where m and n are equal to or greater than 1, an agent consisting of q elements within q systems or q complete systems with q being equal to or greater than 1, means for several interactions between agents including chained, stacked, or clustered interactions, means within each agent to execute several sequences of interactions between agents including cresting, full-wave, and exclusionary sequences, means for communicating from a last activated agent of an interaction to a next pre-designated agent for interaction to allow for at least one execution of said interactions, a control means included in each of the agents to cease drawing electrical energy in an absence of executing one or more of either said interactions or sequences of interactions.

2. The electronic system in claim 1, wherein g agents includes means for obtaining and retaining information on at least one condition or state of g agents with g being greater than 1.

3. The electronic system in claim 1, wherein the interaction between agents is self-modifying in real-time as a result of a detection of x conditions that are either internal or external to said agents with x being greater than or equal to 1.

4. The electronic system in claim 1, wherein the electronic system includes means for executing a possible said interaction that would result from a detection of e conditions that are either internal or external to the electronic system where e is equal to or greater than 1.

5. The electronic system in claim 1, wherein the interactions are employed to increase a processing speed of k agents or k electronic systems with k being greater than or equal to 1.

6. The electronic system in claim 1, wherein the electronic system is implemented on a programmable device or dedicated electronic hardware.

7. The electronic system in claim 1, wherein the electronic system includes means for identifying and then activating, according to pre-defined criteria, a most appropriate agent in the electronic system, to process a given task.

8. The electronic system in claim 1, wherein the electronic system includes means for retaining pre-designated criteria and results from processing a given task.

9. The electronic system in claim 1, wherein a communication between agents is carried by j agents in the full-wave sequence thereby providing for a signal integrity of a communication with j being greater than or equal to 2.

10. The electronic system in claim 1, wherein the agents are in separate physical locations.

11. The electronic system in claim 1, wherein said means for allowing communications between agents is wireless.

12. The electronic system in claim 1, wherein the agents go into a lower energy consumption mode rather than to cease drawing electrical energy in an absence of executing one or more of either said interactions or sequences of interactions.

* * * * *